(12) United States Patent
Kubota

(10) Patent No.: US 7,995,582 B2
(45) Date of Patent: Aug. 9, 2011

(54) MOBILE COMMUNICATION SYSTEM USING BROADCAST COMMUNICATION OR MULTICAST COMMUNICATION

(75) Inventor: Mitsuhiro Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 1079 days.

(21) Appl. No.: 11/364,052

(22) Filed: Mar. 1, 2006

(65) Prior Publication Data

US 2006/0198377 A1 Sep. 7, 2006

(30) Foreign Application Priority Data

Mar. 2, 2005 (JP) .................................. 2005-056760

(51) Int. Cl.
*H04L 12/28* (2006.01)
*H04L 12/56* (2006.01)

(52) U.S. Cl. ........ 370/394; 714/748; 455/436; 455/437; 455/438; 455/439; 455/440; 455/441; 455/442; 455/443; 455/444

(58) Field of Classification Search .................. 370/394; 714/748; 455/436–444
See application file for complete search history.

(56) References Cited

U.S. PATENT DOCUMENTS

| 4,841,526 | A   | * | 6/1989  | Wilson et al. ................. | 714/748 |
| 5,521,732 | A   | * | 5/1996  | Nishio ............................ | 398/51  |
| 5,966,668 | A   | * | 10/1999 | Lindroth ....................... | 455/555 |
| 6,728,233 | B1  | * | 4/2004  | Park et al. .................... | 370/342 |
| 7,136,483 | B2  | * | 11/2006 | Khaleghi et al. .............. | 379/448 |
| 7,165,203 | B2  | * | 1/2007  | Baudry et al. ................. | 714/748 |
| 2002/0046379 | A1 | * | 4/2002 | Miki et al. ..................... | 714/749 |
| 2002/0071407 | A1 | * | 6/2002 | Koo et al. ...................... | 370/335 |
| 2002/0095636 | A1 | * | 7/2002 | Tatsumi et al. ................ | 714/748 |
| 2002/0154610 | A1 | * | 10/2002 | Tiedemann et al. .......... | 370/329 |
| 2003/0067896 | A1 | * | 4/2003 | Chuah et al. .................. | 370/331 |
| 2004/0218561 | A1 |   | 11/2004 | Obuchi et al. |         |
| 2004/0229624 | A1 | * | 11/2004 | Cai et al. ....................... | 455/449 |
| 2004/0266469 | A1 | * | 12/2004 | Hayashi et al. ............... | 455/522 |
| 2005/0048975 | A1 | * | 3/2005 | Ranta-Aho et al. ........... | 455/438 |
| 2008/0253394 | A1 | * | 10/2008 | Spinar et al. .................. | 370/468 |

FOREIGN PATENT DOCUMENTS

| CN | 1428949 A    | 7/2003  |
| GB | 2 375 001    | 10/2002 |
| JP | 2001-186559 A | 7/2001  |
| JP | 2003-324762 A | 11/2003 |
| JP | 2004-201162 A | 7/2004  |
| JP | 2004-320481 A | 11/2004 |
| JP | 3919747 B2   | 5/2007  |

* cited by examiner

*Primary Examiner* — Ayaz R Sheikh
*Assistant Examiner* — Peter Chau
(74) *Attorney, Agent, or Firm* — Sughrue Mion, PLLC

(57) ABSTRACT

Disclosed is the retransmission control method used in a mobile communication system including mobile terminals (MTs), base stations (BSs) and the radio network controller (RNC) which controls the BSs. When an MT detects data error, it sends the 1st negative acknowledgement (NACK) to the BS. This first NACK includes a cell ID which indicates the cell where the reception data is transmitted. When cell ID in this 1st NACK includes cell ID of a cell besides the cell which the BS itself manages, the BS sends the 2nd NACK to the RNC. This 2nd NACK includes the cell ID and the data number to specify the data in which the mobile terminal detected the data error. The RNC decides the BS where data is to be retransmitted based on the cell IDs in the 2nd NACK and sends data retransmission request to the decided BS.

26 Claims, 10 Drawing Sheets

| MT | NB | | RNC |
|---|---|---|---|
| SEQUENCE NUMBER | SEQUENCE NUMBER | DATA NUMBER | DATA NUMBER |
| 61 | 61 | 1 | 1 |
| 62 | 62 | 2 | 2 |
| 63 | 63 | 3 | 3 |
| 64 | 64 | 4 | 4 |
| 65 | 65 | 5 | 5 |
| 66 | 66 | 6 | 6 |
| 67 | 67 | 7 | 7 |

FIG.7

MOBILE COMMUNICATION SYSTEM USING BROADCAST COMMUNICATION OR MULTICAST COMMUNICATION

BACKGROUND OF THE INVENTION

1. Field of the Invention

The present invention relates to a retransmission control technique in a mobile communication system and, more particularly, to a mobile communication system which uses broadcast communication or multicast communication, a mobile terminal, base station, and radio network controller which constitute part of the system, a retransmission control method used therein, and a program therefor.

2. Description of the Related Art

In a mobile communication system such as a cellular mobile communication system, when there are many mobile terminals that receive the same service within a single cell, a base station or mobile terminal performs data transmission using a common channel of a radio network. Use of such a common channel contributes to effective utilization of radio resources. For example, Japanese Patent Laid-Open No. 2004-320481 describes use of this common channel.

However, if a network provider is to provide a service by broadcast communication or multicast communication using a common channel, it is difficult for the network provider to provide the service to all mobile terminals with almost equal reception quality. A mobile terminal at the edge of a cell is particularly likely to suffer interference or a reduction in power which occurs during data transmission and often receives data with lower reception quality than other terminals.

When using a common channel, a base station cannot individually control mobile terminals with ease. For this reason, it is more difficult to avoid a reduction in data quality in data communication using a common channel than that using individual channels.

To cope with this, there can be considered combination of the common channel technique and a selective combining technique (or a soft combining technique). In this combined technique, a plurality of cells in a radio network are integrated into one or more groups in advance. All base stations (or Node-Bs) that belong to a single cell group simultaneously transmit identical data. In this case, a mobile terminal at the edge of a cell can also simultaneously receive identical data transmitted from an adjacent cell. Accordingly, the combined technique moderates a reduction in reception data quality.

In the technique, when a terminal which belongs to a cell group detects an error in received data, it transmits a negative acknowledgment (NACK) to a base station. In response to the negative acknowledgment, all base stations that belong to the cell group perform data retransmission. More specifically, even when only terminals that belong to some cells within the cell group detect an error in received data, all the base stations within the cell group retransmit the data which the some terminals have failed to properly receive. This data retransmission unnecessarily increases the traffic of cells to which only terminals having properly received the data belong.

As described above, when using a common channel at the time of broadcast transmission or multicast transmission, unnecessary data retransmission may prevent efficient use of network resources.

Under the circumstances, there is a need for a technique for improving the reception quality by using a selective combining technique (or a soft combining technique) while maintaining the advantage in using a common channel, i.e., efficient use of network resources.

SUMMARY OF THE INVENTION

The first exemplary feature of the invention provides a mobile communication system which reduces unnecessary data retransmission.

According to the first aspect of the invention, there is provided the retransmission control method used in a mobile communication system including mobile terminals, base stations and the radio network controller which controls the base stations. When a data error is detected, a mobile terminal sends the 1st negative acknowledgement (NACK) to the base station. This first NACK includes cell identification information (cell ID) which indicates the cell where the reception data is transmitted. When cell ID in this 1st NACK includes cell ID of a cell besides the cell which the base station itself manages, the base station sends the 2nd NACK to the radio network controller. This 2nd NACK includes the cell ID and the data number to specify the data in which the mobile terminal detected the data error. The radio network controller decides the BS where the data is to be retransmitted based on the cell IDs in the 2nd NACK and sends data retransmission request to the decided base station.

According to the first aspect of the invention, the mobile terminal transmits a first negative acknowledgment to the base station upon detection of an error in received data. The base station determines on the basis of cell identification information in the first negative acknowledgment from the mobile terminal whether to perform data retransmission alone. The determination is made by determining whether the cell identification information in the first negative acknowledgment indicates only a cell managed by the base station.

If the base station has to perform data retransmission along with a different base station, it transmits a second negative acknowledgment to the radio network controller. The radio network controller decides base stations which are to perform data retransmission on the basis of cell identification information in the second negative acknowledgment and transmits a data retransmission request to the decided base stations. In the first aspect of the invention, a base station performs data retransmission only in a cell from which erroneous data is received by a mobile terminal. Accordingly, the first aspect of the invention suppresses unnecessary data retransmission.

According to the first aspect of the invention, it becomes possible for a radio network side to know a rough current position and data reception situation of the mobile terminal by including, in a negative acknowledgment, identification information of a cell from which the data is received by the mobile terminal when the mobile terminal transmits the negative acknowledgment. Accordingly, in the first aspect of the invention, since the network side can select a base station or base stations which are to perform data retransmission by designating a cell, unnecessary data retransmission can be reduced.

According to the second exemplary aspect of the invention, in addition to the first aspect of the invention, the radio network controller transmits a data retransmission time to the decided base stations together with a data retransmission request. This allows data retransmission in which synchronization is maintained among a plurality of base stations.

Other features and aspects of the invention will become apparent from the following description of preferred embodiments.

BRIEF DESCRIPTION OF THE DRAWINGS

In the accompanying drawings:

FIG. 7 is a chart showing an example of a correspondence table of data numbers and sequence numbers accumulated in a mobile terminal, base station, and radio network controller;

DETAILED DESCRIPTION OF THE PREFERRED EMBODIMENTS

An embodiment of the present invention will be explained with reference to the drawings.

Figure 1:
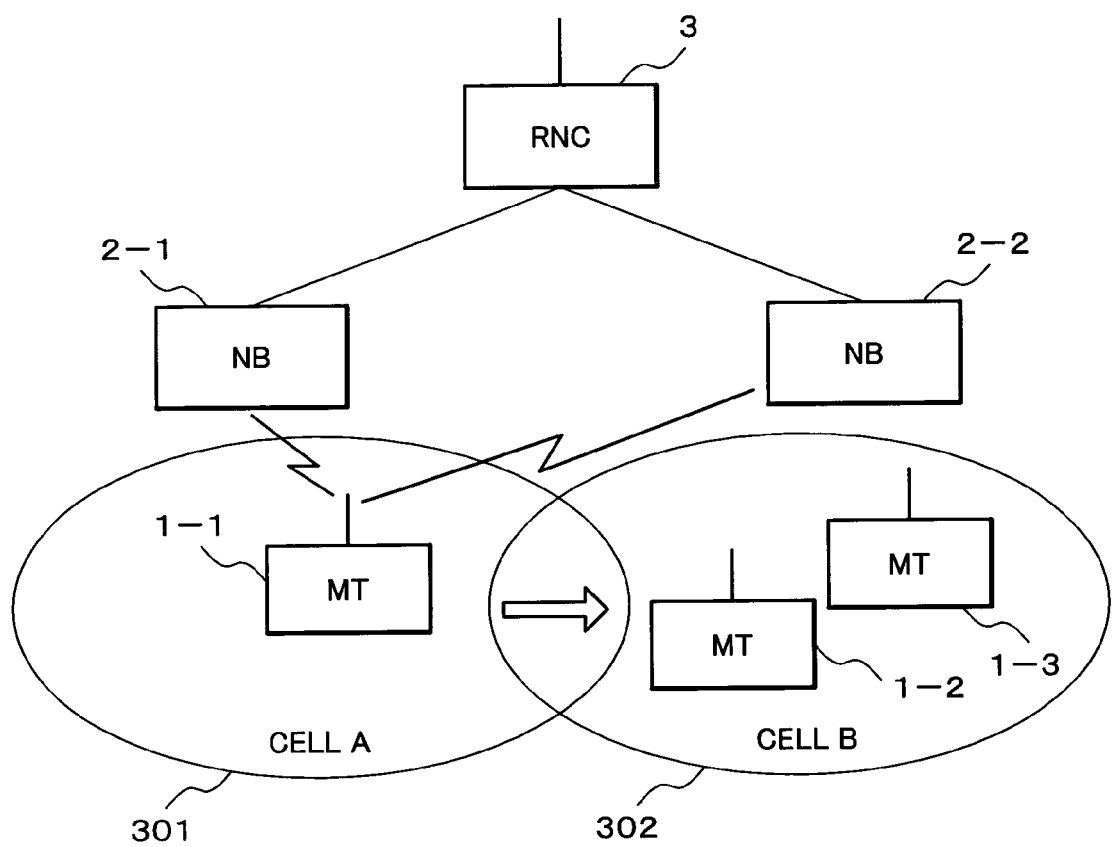
FIG. 1 is a diagram showing the configuration of a radio network of a mobile communication system according to an embodiment of the present invention.

FIG. 1 shows the configuration of a radio network of a mobile communication system according to an embodiment of the present invention. In FIG. 1, the mobile communication system according to this embodiment is composed of mobile terminals (MTs) 1-1 and 1-2, base stations (NBs) 2-1 and 2-2, and a radio network controller (RNC) 3. Note that in FIG. 1, each mobile terminal is abbreviated as "MT", each base station, "NB", and the radio network controller, "RNC". In the following explanation, the base station may also be abbreviated as "Node-B."

In FIG. 1, the mobile terminal 1-1 is located within a cell A designated by reference numeral 301 and receives data transmitted from the base station 2-1. The mobile terminal 1-1 also receives data from the base station 2-2. That is, the mobile terminal 1-1 receives identical data almost simultaneously from the two base stations 2-1 and 2-2. The mobile terminals 1-2 and 1-3 are located within a cell B designated by reference numeral 302 and communicates only with the radio base station 2-2.

The mobile terminals (MTs) 1-1 to 1-3 each have a function of transmitting data and a function of receiving identical data transmitted from a plurality of base stations and performing the process of selecting from among (or combining) the received data and the process of detecting an error in the received data. The mobile terminals 1-1 to 1-3 also each have a function of, if it detects an error (or uncorrectable error) in any of the data received from the base station 2-1 and/or 2-2 through a common channel, transmitting to the base station(s) a negative acknowledgment requesting retransmission of the data. The negative acknowledgment contains the identification information of a cell (e.g., a cell ID) from which the data is received. The negative acknowledgment also contains a sequence number for specifying the data requiring retransmission.

The mobile terminals 1-1 to 1-3 may further each have a function of abandoning unsolicited retransmitted data. Each terminal may receive data which has previously been normally received. If each terminal again receives data which has already been received, it abandons the reobtained data using the function.

Moreover, the mobile terminals 1-1 to 1-3 may each have a function of holding received incomplete data for a predetermined time after transmitting a negative acknowledgment and then abandoning the data.

The base stations 2-1 and 2-2 each have a function of transmitting and receiving data, a function of analyzing a negative acknowledgment transmitted from each of the mobile terminals 1-1 to 1-3 and determining whether to perform data retransmission now or to transmit the negative acknowledgment to the radio network controller 3, and a function of performing retransmission control. The base stations 2-1 and 2-2 also each have a buffer for retaining transmitted data for a predetermined time to perform retransmission control. Additionally, the base stations 2-1 and 2-2 each have a function of erasing the transmitted data after a lapse of the predetermined time. The base stations 2-1 and 2-2 further each manage a sequence number-data number correspondence table used for retransmission control. A data number (to be described later) is attached to a negative acknowledgment transferred to the radio network controller 3. Each base station can convert a sequence number to a data number by referring to the correspondence table.

The radio network controller 3 decides, for each data number, base stations which are to perform data retransmission from cell identification information contained in negative acknowledgments transferred from base stations. The radio network controller 3 issues a data retransmission request to the decided base stations. At the time of the data retransmission request, the radio network controller 3 may tell a time for transmitting retransmission data to the decided base stations.

The mobile terminals 1-1 to 1-3, base stations 2-1 and 2-2, and radio network controller 3 shown in FIG. 1 each have many functions in addition to the above-described functions. Since these many functions are well known to the skilled persons in the art and are not directly related to the present invention, a detailed explanation thereof will be omitted.

Figure 2:
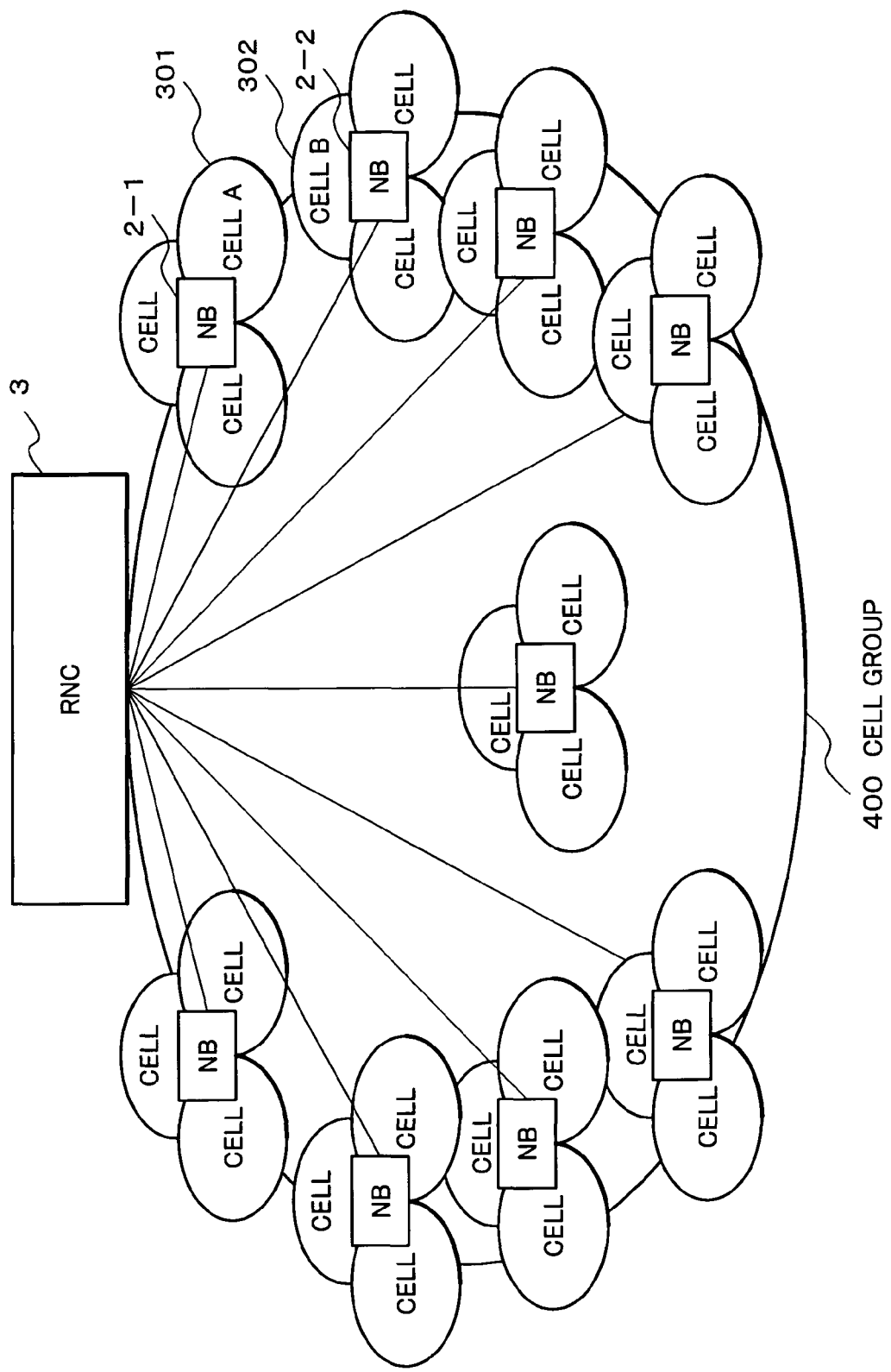
FIG. 2 is a diagram showing an example of a cell group according to the embodiment of the present invention.

FIG. 2 is a diagram showing a cell group according to the embodiment of the present invention. FIG. 2 shows a cell group 400 into which a plurality of cells are integrated. In FIG. 2, "NB" represents a base station, and "RNC" represents a radio network controller. Base stations and mobile terminals transmit and receive data in cells under the direct or indirect control of the radio network controller 3. In a selective combining technique or soft combining technique, base stations simultaneously transmit identical data in all cells within the cell group 400. Note that in FIG. 2, the mobile terminal 1-1 (not shown) is located within the cell A (301), similarly to FIG. 1.

In broadcast communication or multicast communication, a radio network provides services to many cells and many mobile terminals. Each base station (NB) transmits data using a common channel. The radio network controller 3 attaches a data number to broadcast or multicast data and distributes the data to base stations.

When the mobile terminal 1-1 detects an error in received data, it transmits the identification number(s) of a cell (or cells) from which the data is received to the base station 2-1, to which the mobile terminal 1-1 belongs, together with a negative acknowledgment.

Upon receipt of the negative acknowledgment, the base station 2-1 checks the cell identification information contained in the negative acknowledgment. If the mobile terminal 1-1 has received data from a plurality of cells (e.g., the cell identification information in the negative acknowledgment includes the cell identification information of the cell B (302), which is not managed by the base station 2-1), the base station 2-1 transfers the negative acknowledgment to the radio network controller 3. The negative acknowledgment transferred to the radio network controller 3 contains the data number of the data requiring retransmission and the identification numbers of the cells received from the mobile terminal 1-1.

Since the mobile terminal 1-2 receives data only from the base station 2-2, a negative acknowledgment which the base station 2-2 receives from the mobile terminal 1-2 contains only the cell identification information of the cell B (302) managed by the base station 2-2. In this case, the base station 2-2 alone retransmits data to the mobile terminal 1-2.

The radio network controller 3 having received the negative acknowledgment from the base station 2-1 checks the negative acknowledgment. The radio network controller 3 then specifies the base stations which manage the cells corresponding to the cell identification information in the negative acknowledgment. The radio network controller 3 transmits a data retransmission request, the data number. It is favorable that the RNC also send a data retransmission time along with the data retransmission request to the base stations specified in this manner. For example, a transmission frame number in a base station can be used as a retransmission time. Alternatively, in the case of a system in which synchronization is maintained among base stations using a method such as the Global Positioning System (GPS), a transmission time or the like can be used as a retransmission timing signal.

Upon receipt of the data retransmission request from the radio network controller 3, each of the base stations identifies the data requiring retransmission using the designated data number and retransmits data to the mobile terminal 1-1 at the designated time.

Figure 3:
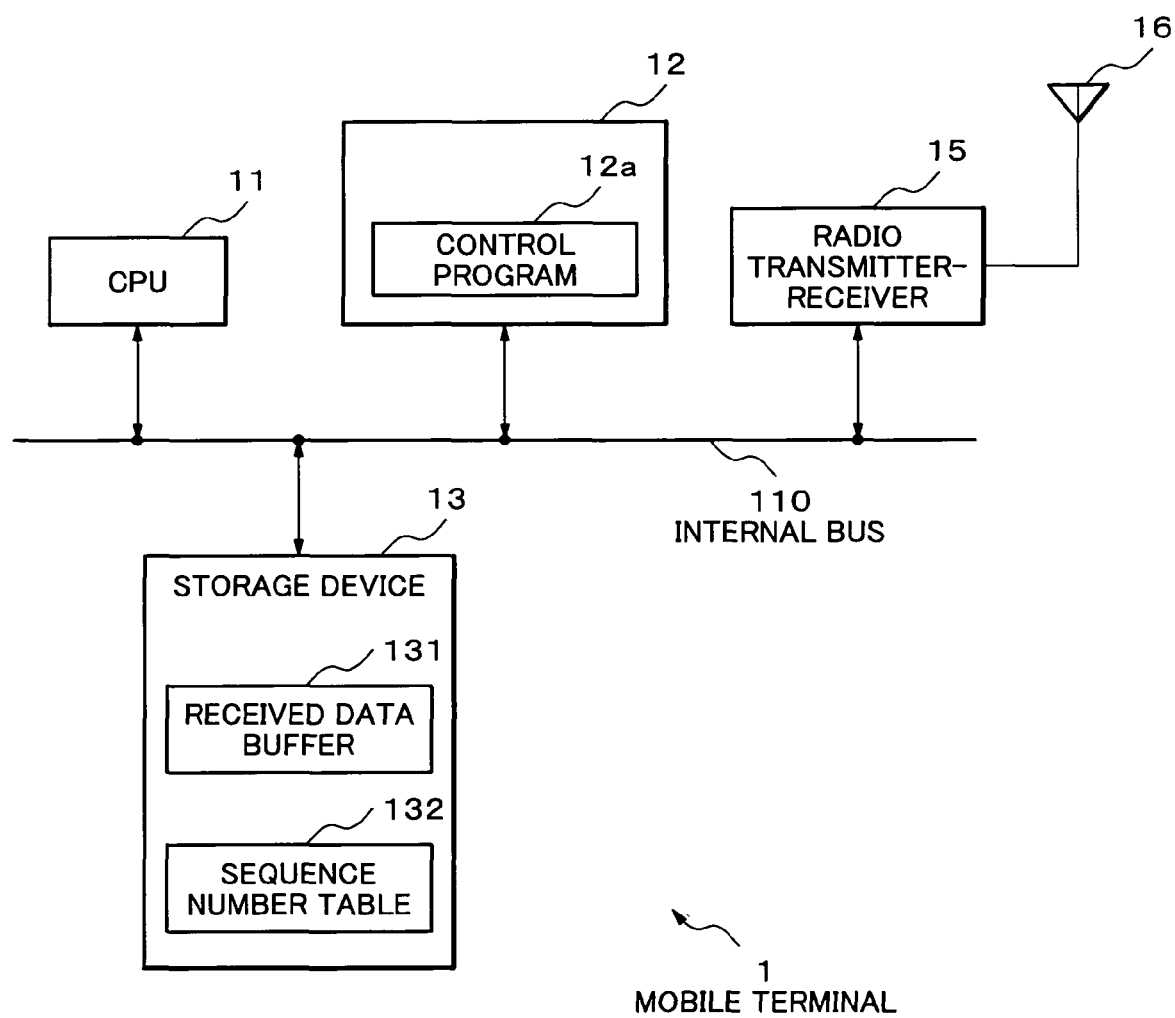
FIG. 3 is a block diagram showing an example of the configuration of a mobile terminal according to the embodiment of the present invention.

FIG. 3 is a block diagram showing an example of the configuration of a mobile terminal according to the embodiment of the present invention. In FIG. 3, a mobile terminal 1 includes a CPU (Central Processing Unit) 11, a main memory 12, a storage device 13, a radio transmitter-receiver 15, and an antenna 16.

The main memory 12 stores a control program 12*a* to be executed by the CPU 11. The storage device 13 includes a data buffer 131 and a sequence number table 132. The data buffer 131 temporarily holds received data. The sequence number table 132 holds a sequence number. The radio transmitter-receiver 15 performs communication with a base station.

In the mobile terminal 1, an internal bus 110 interconnects the CPU 11, main memory 12, storage device 13, and radio transmitter-receiver 15.

Note that the configurations of the mobile terminals 1-1 to 1-3 are the same as that of the mobile terminal 1 in FIG. 3. The CPU 11 implements the above-described functions of each mobile terminal by executing the control program 12*a*.

Figure 4:
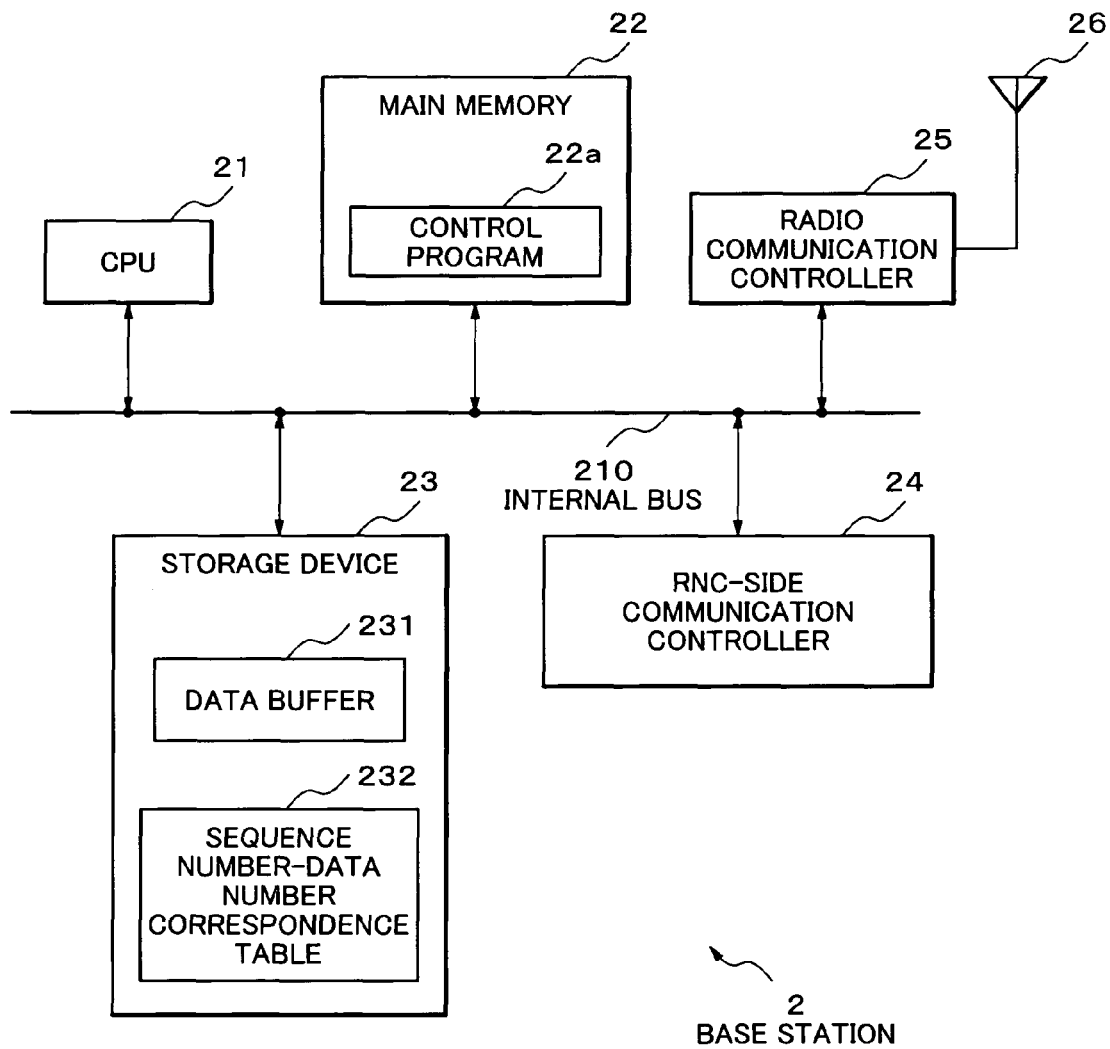
FIG. 4 is a block diagram showing an example of the configuration of a base station according to the embodiment of the present invention.

FIG. 4 is a block diagram showing an example of the configuration of a base station according to the embodiment of the present invention. In FIG. 4, a radio base station 2 includes a CPU (Central Processing Unit) 21, a main memory 22, a storage device 23, a radio network controller-side communication controller 24, a radio communication controller 25, and an antenna 26.

The main memory 22 stores a control program 22*a* to be executed by the CPU 21. The storage device 23 includes a data buffer 231 and a sequence number-data number correspondence table 232. The data buffer 231 temporarily holds transmitted data. The sequence number-data number correspondence table 232 holds the correspondence between sequence numbers and data numbers. The radio network controller-side communication controller 24 controls communication with the radio network controller 3 side. The radio communication controller 25 controls communication with a mobile terminal.

In the base station 2, an internal bus 210 interconnects the CPU 21, main memory 22, storage device 23, radio network controller-side communication controller 24, and radio communication controller 25. Note that the configurations of the base stations 2-1 and 2-2 in FIG. 1 are the same as that of the base station 2 in FIG. 4. The CPU 21 implements the above-described functions of each base station by executing the control program 22*a*.

Figure 5:
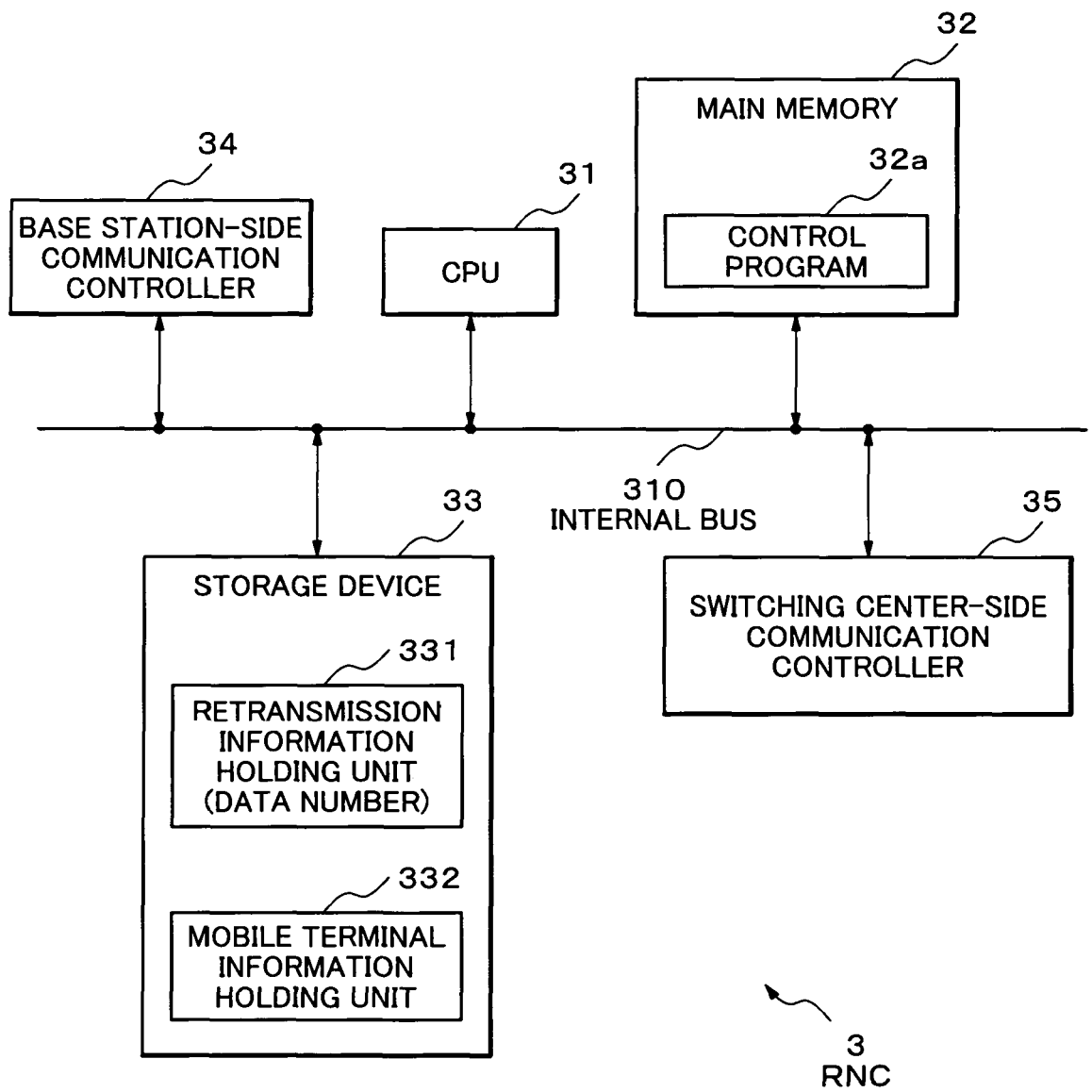
FIG. 5 is a block diagram showing an example of the configuration of a radio network controller according to the embodiment of the present invention.

FIG. 5 is a block diagram showing an example of the configuration of a radio network controller (RNC) according to the embodiment of the present invention. In FIG. 5, the radio network controller 3 includes a CPU 31, a main memory 32, a storage device 33, a base station-side communication controller 34, and a switching center-side communication controller 35.

The main memory 32 stores the control program 32*a* to be executed by the CPU 31.

The storage device 33 includes a retransmission information holding unit 331 and a mobile terminal information holding unit 332. The retransmission information holding unit 331 holds retransmission information including a data number. The mobile terminal information holding unit 332 holds mobile terminal information including the position information of the mobile terminals 1-1 to 1-3. The base station-side communication controller 34 controls communication with the base station 2-1 side and the base station 2-2 side. The switching center-side communication controller 35 controls communication with a switching center (not shown) side.

In the radio network controller 3, an internal bus 310 interconnects the CPU 31, main memory 32, storage device 33, base station-side communication controller 34, and switching center-side communication controller 35. The CPU 31 implements the above-described functions of the radio network controller 3 by executing the control program 32*a*.

Figure 6:
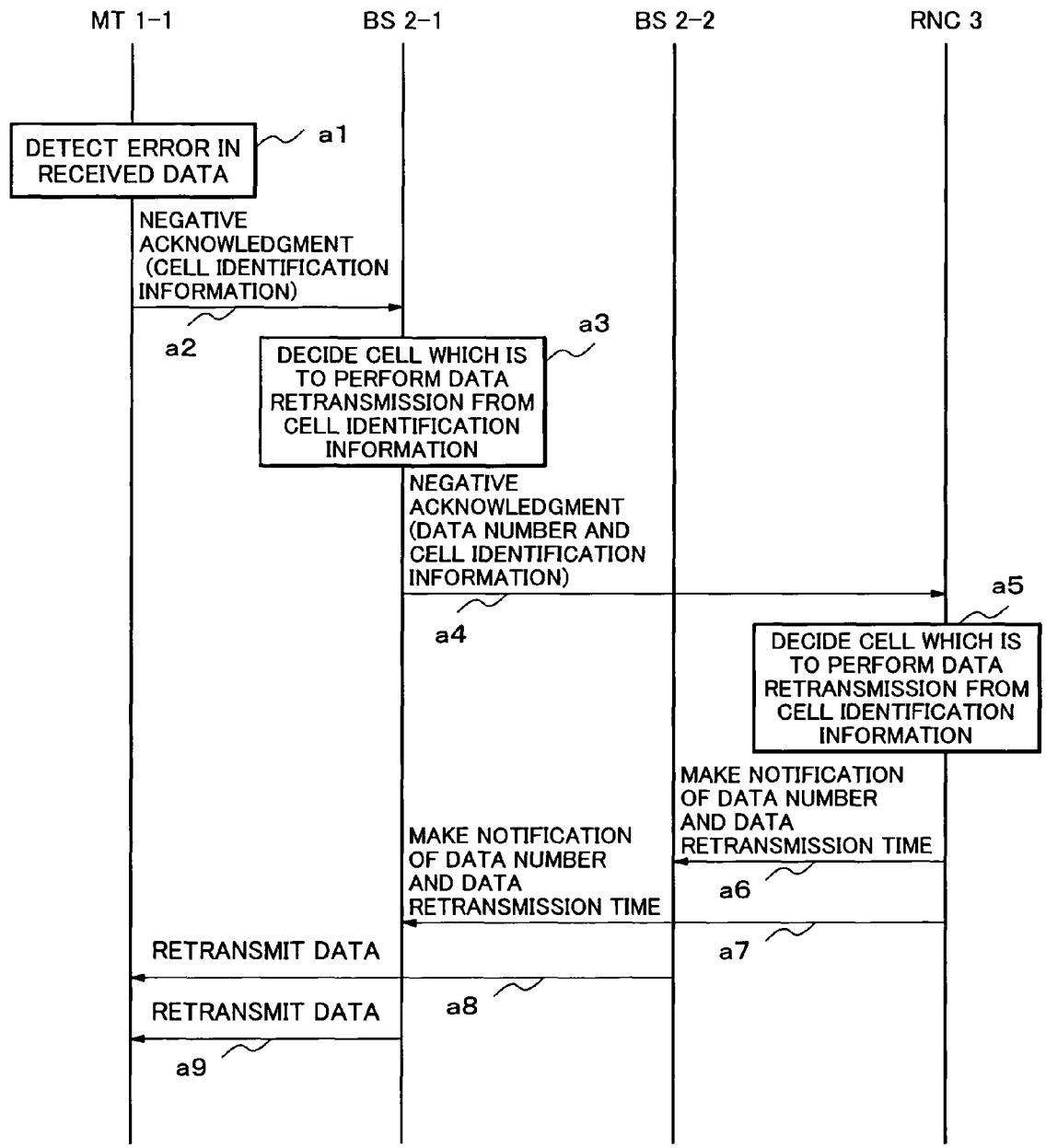
FIG. 6 is a sequence chart showing data retransmission operation in the mobile communication system according to the embodiment of the present invention.

FIG. 6 is a sequence chart for explaining data retransmission operation in the mobile communication system according to the embodiment of the present invention. The data retransmission operation in the mobile communication system according to the embodiment of the present invention will be explained with reference to FIGS. 1 to 6. Note that FIG. 6 shows the data retransmission procedure in the mobile communication system when the mobile terminal 1-1 receives data from the base stations 2-1 and 2-2.

The mobile terminal 1-1 receives data which the base stations transmit by broadcast or multicast. When the mobile terminal 1-1 detects an error in received data (a1 in FIG. 6), it transmits a negative acknowledgment to the base station 2-1 (a2 in FIG. 6). At this time, the negative acknowledgment contains the sequence number of the data having the detected error and the identification information of cells from which the mobile terminal 1-1 has received the data. The mobile terminal 1-1 may be configured not to transmit a negative acknowledgment if it detects no error in at least one of data from the base station 2-1 and that from the base station 2-2.

The base station 2-1 checks the cell identification information in the negative acknowledgment and decides a cell in which data retransmission is to be performed (a3 in FIG. 6). When the mobile terminal 1-1 has received the data from the plurality of base stations, the base station 2-1 transfers the negative acknowledgment to the radio network controller 3 (a4 in FIG. 6). The negative acknowledgment transferred to the radio network controller 3 contains a data number and the cell identification information. For example, in the case of FIG. 1, the negative acknowledgment contains the cell identification information of the cell A (301) and that of the cell B (302). Since the base station 2-1 does not manage the cell B (302), it transfers the negative acknowledgment from the mobile terminal 1-1 to the radio network controller 3.

When the negative, acknowledgment is transferred from the base station 2-1, the radio network controller 3 checks the cell identification information in the negative acknowledgment. The radio network controller 3 decides cells which are to perform data retransmission (a5 in FIG. 6). The radio network controller 3 transmits a data retransmission time to the base stations 2-1 and 2-2, which manage the decided cells, together with a data retransmission request (a6 and a7 in FIG. 6). Upon receipt of the data retransmission request from the radio network controller 3, the base stations 2-1 and 2-2 each retransmit the designated data at the designated time (a8 and a9 in FIG. 6).

FIG. 7 is a chart showing the correspondence between data numbers and sequence numbers according to the embodiment of the present invention. A column headed "MT" in FIG. 7 shows examples of a sequence number held in the mobile terminal 1 ("61," "62," "63," "64," "65," "66," and "67"). A column headed "NB" in FIG. 7 shows an example of the correspondence between sequence numbers ("61," "62," "63," "64," "65," "66," and "67") and data numbers ("1," "2," "3," "4," "5," "6," and "7") held in the base station 2. A column headed "RNC" in FIG. 7 shows data numbers held in the radio network controller 3 ("1," "2," "3," "4," "5," "6," and "7").

A common data number is used between the radio network controller 3 and base stations under its control. A sequence number which is an identifier different from data numbers is used between the mobile station 1 and the base station 2 to perform data retransmission. The base station 2 manages a correspondence table of data numbers and sequence numbers (see the column headed NB in FIG. 7). The base station 2 checks a data number corresponding to a received negative acknowledgment using the correspondence table and transmits the data number to the radio network controller 3 together with cell identification information.

The operations directly related to the present invention of a mobile terminal, base station, and radio network controller will be explained with reference to FIGS. 8A, 8B, and 8C. Note that in the following explanation, an arbitrary one of the mobile terminals 1-1 to 1-3 is represented as the mobile terminal 1, and an arbitrary one of the base stations 2-1 and 2-2 is represented as the base station 2.

Figure 8A:
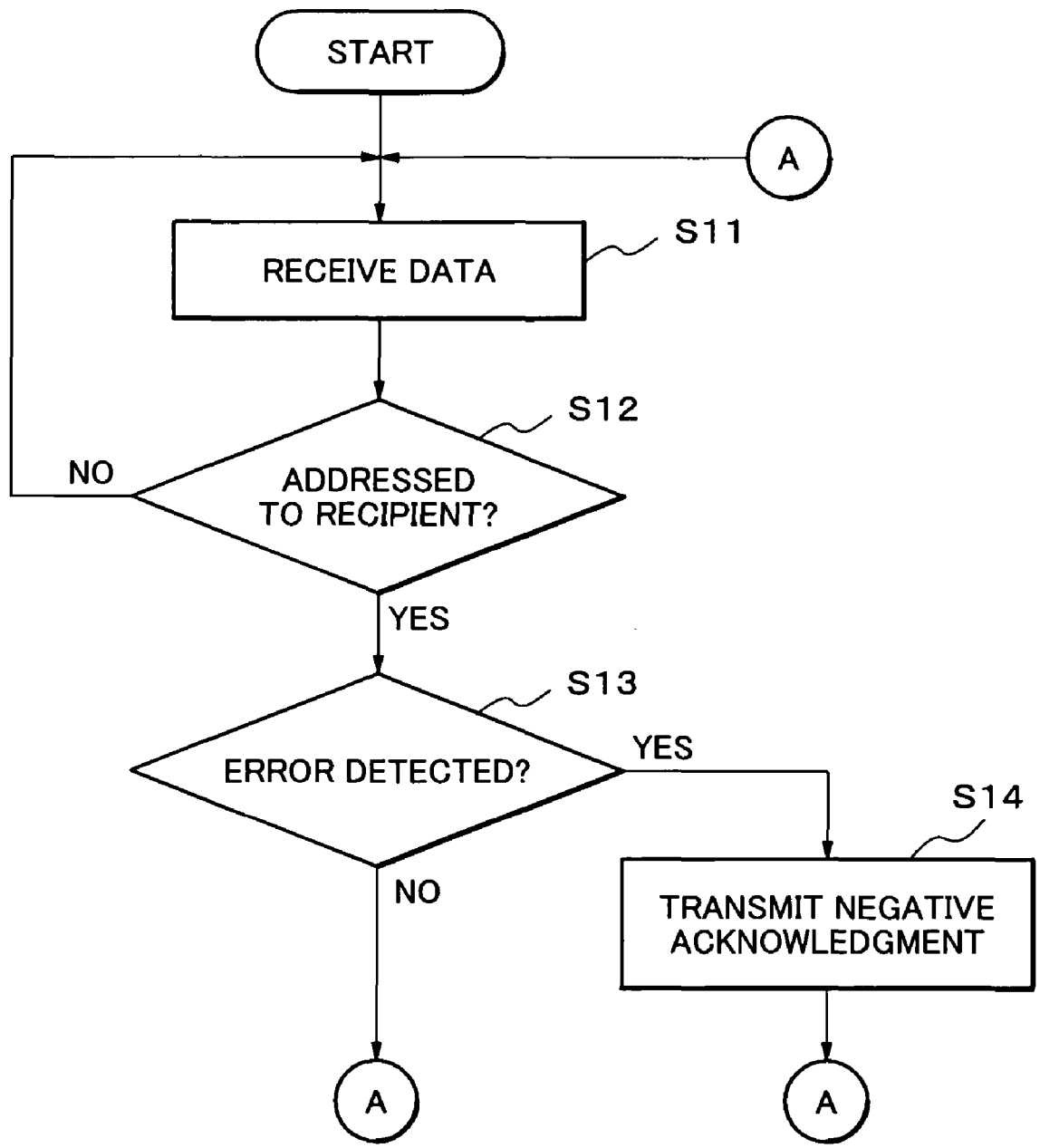
FIG. 8A is a flowchart showing the operation of a mobile terminal according to the embodiment of the present invention.

FIG. 8A is a flowchart for explaining the operation of a mobile terminal according to the embodiment of the present invention.

In step S11 of FIG. 8A, the mobile terminal 1 receives data from the base station 2.

In step S12, the mobile terminal 1 determines whether the received data is addressed to the mobile terminal 1. If the received data is not addressed to it, the processing of the mobile terminal 1 returns to step S11 to wait for receipt of next data. At this time, the mobile terminal 1 abandons the received data. For example, if the received data is not retransmission data which the mobile terminal 1 itself requests, the mobile terminal 1 abandons the received data. If the received data is addressed to the mobile terminal 1, the processing thereof advances to step S13.

In step S13, the mobile terminal 1 detects the presence or absence of an error (or an uncorrectable error) in the received data. If an error is detected, the mobile terminal 1 transmits in return a negative acknowledgment to the base station 2 in step S14. The negative acknowledgment includes, the sequence number of the data having the detected error and the dell identification information indicating one or a plurality of cells from which the mobile terminal 1 receives the data. After that, the processing of the mobile terminal 1 returns to step S11.

If it is determined in step S13 that there is no error in the received data, the processing of the mobile terminal 1 returns to step S11.

Figure 8B:
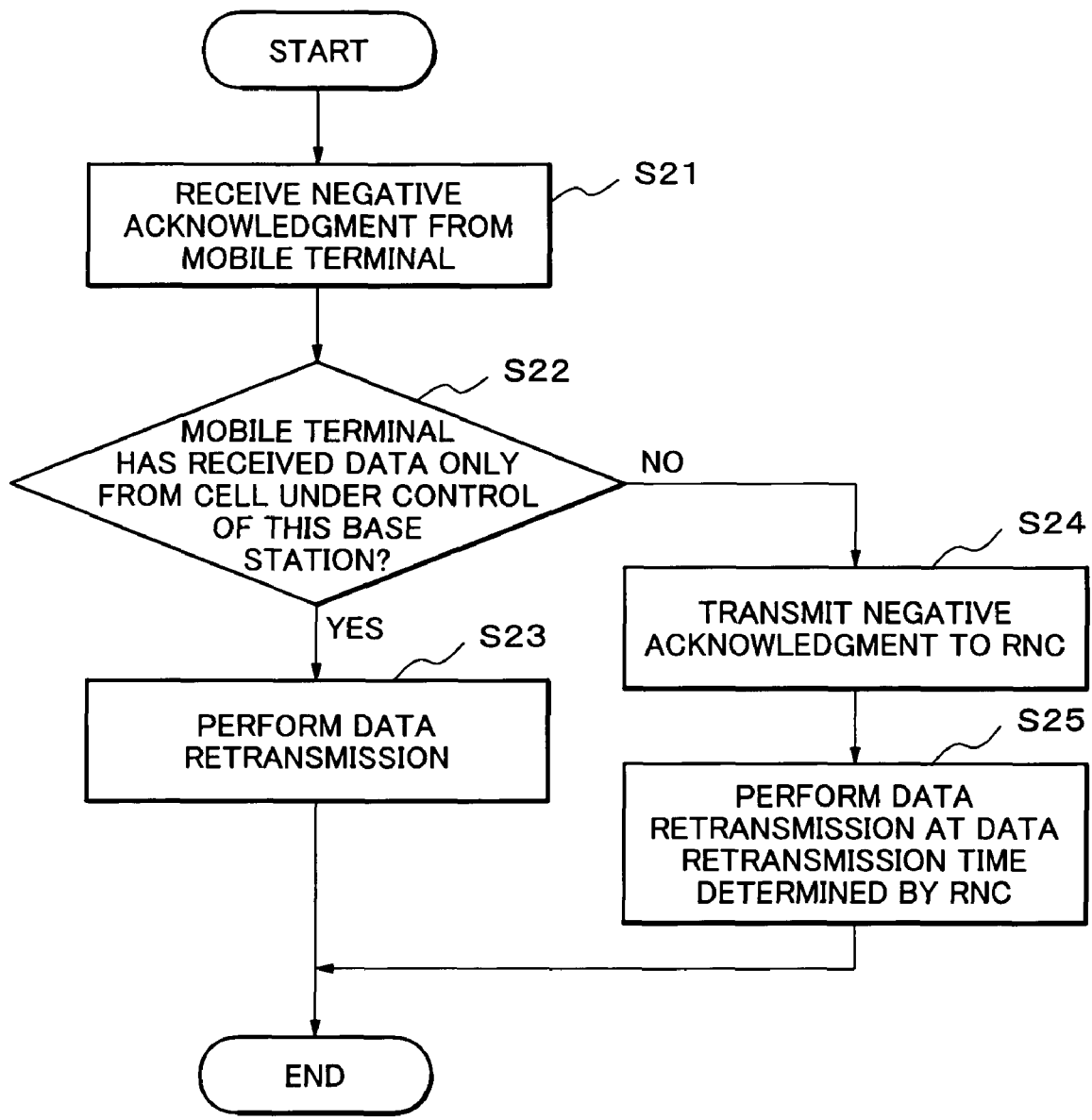
FIG. 8B is a flowchart showing the operation of a base station according to the embodiment of the present invention.

FIG. 8B is a flowchart for explaining the operation of a base station according to the embodiment of the present invention. FIG. 8B shows operation when a base station receives a negative acknowledgment from a mobile terminal.

When the base station 2 receives a negative acknowledgment from the mobile terminal 1 (step S21 of FIG. 8B), it checks the contents of the negative acknowledgment (step S22 of FIG. 8B). If the cell identification information in the negative acknowledgment indicates only a cell (or cells) that is (are) managed by the base station 2, the base station 2 performs data retransmission to the mobile terminal 1 (step S23 of FIG. 8B).

If the cell identification information in the negative acknowledgment from the mobile terminal 1 contains the cell identification information of a cell other than the cell(s) managed by the base station 2 (NO in step S22), the base station 2 transmits a negative acknowledgment to the radio network controller 3 (step S24 of FIG. 8B). The negative acknowledgment transferred to the radio network controller 3 contains the data number of data requiring retransmission and the cell identification information.

As described above, upon receipt of the negative acknowledgment, the radio network controller 3 requests retransmission of the data, for which the negative acknowledgment is meant, from a base station corresponding to the cell identification information contained in the negative acknowledgment. At this time, the radio network controller 3 notifies the base station of the data number of the data, for which the retransmission request is meant for, and a data retransmission time.

Upon receipt of the data retransmission request from the radio network controller 3, the base station 2 retransmits the designated data at the designated time (step S25 of FIG. 8B). With this operation, the mobile terminal 1 can receive identical data simultaneously retransmitted in a plurality of cells.

Figure 8C:
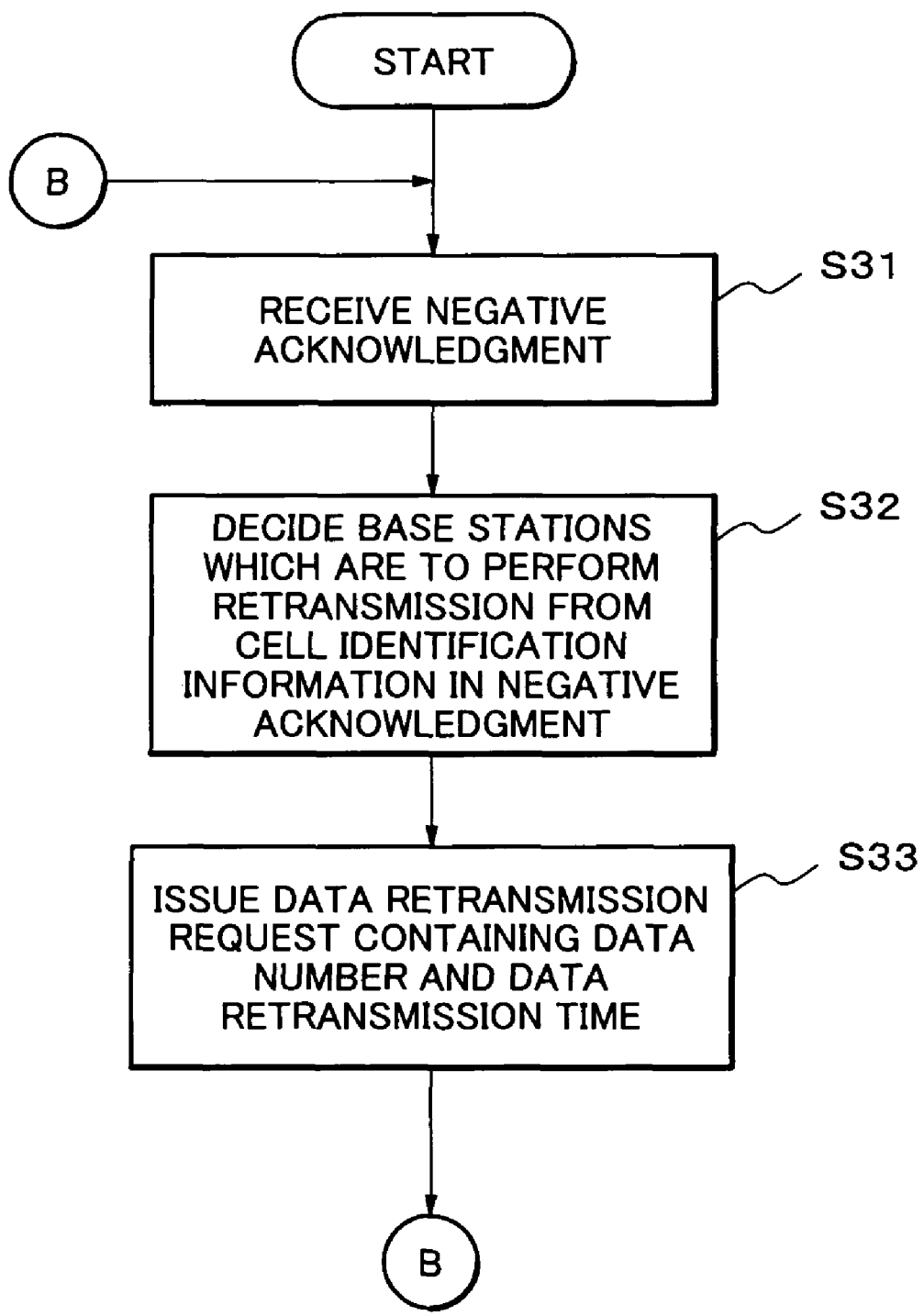
FIG. 8C is a flowchart showing the operation of a radio network controller according to the embodiment of the present invention.

FIG. 8C is a flowchart for explaining the operation of a radio network controller according to the embodiment of the present invention.

In step S31, the radio network controller 3 receives a negative acknowledgment from one or more base stations. Then, the radio network controller 3 checks cell identification information contained in the negative acknowledgment and decides base stations which are to perform data retransmission (step S32 of FIG. 8C). The radio network controller 3 decides, for each data number, a base station which is to perform data retransmission. In step S33, the radio network controller 3 issues a retransmission request to the decided base station or each of the decided base stations. A retransmission request contains the data number of data to be retransmitted and a data retransmission time.

As described above, in this embodiment, when each mobile terminal detects an error in received data, it transmits, to a corresponding base station, a negative acknowledgment containing the identification information of a cell from which the data is received. If the mobile terminal has received the data only from the base station, the base station alone performs data retransmission to the mobile terminal. If the mobile terminal has received the data from a plurality of base stations, the base station transfers the negative acknowledgment to the radio network controller 3.

In this embodiment, when the radio network controller 3 receives a negative acknowledgment from a base station, it causes only a base station involved to perform data retransmission. A base station managing a cell in which data retransmission is unnecessary does not perform data retransmission. This embodiment also makes it possible to transmit a data retransmission time together with a data retransmission request. This implements data retransmission in which synchronization is maintained among a plurality of base stations.

Therefore, this embodiment implements retransmission control using selective combining or soft combining and improves the reception quality at the time of service provision by broadcast or multicast.

The present invention can also be applied to a system using a code division multiple access such as Wideband Code Division Multiple Access (W-CDMA). An example in the third generation mobile communication system will be explained below.

As a method of providing broadcast and multicast services in the mobile communication system, there is available Multimedia Broadcast Multicast Service (MBMS). MBMS uses a Point-to-Multipoint (PtM) link in which data is distributed among a plurality of users and a Point-to-Point (PtP) link in which data is individually distributed.

At the time of service provision through a PtM link of MBMS, selective combining or soft combining is used to ensure good quality of data for a mobile terminal at the edge of a cell. When either of these techniques is used, a plurality of cells form a cell group. In all cells that belong to the cell group, base stations simultaneously transmit identical data. In this case, a mobile terminal at the edge of a cell can also receive data transmitted from a base station of an adjacent cell. Accordingly, the mobile terminal can improve the quality of received data by performing the process of selecting from among (or combining) the received data and the process of correcting an error in the received data.

An example of retransmission control performed by a base station in a system using a selective combining technique or soft combining technique will be explained below.

When a mobile terminal which receives a service provided by broadcast or multicast using MBMS detects an error in received data, it transmits a negative acknowledgment to a base station.

If the mobile terminal is one which is located at the edge of a cell and receives data in a plurality of cells, it transmits a negative acknowledgment to a base station which manages the cell, in which the mobile terminal is currently located. The negative acknowledgment contains the cell IDs of all of cells from which the mobile terminal currently receives data. For example, a Random Access Channel (RACH) may be available as a common channel used by the mobile terminal to transmit a negative acknowledgment.

Upon receipt of a negative acknowledgment from the mobile terminal, the base station checks a cell ID (cell IDs) in the negative acknowledgment. If the cell ID or each of the cell IDs indicates only a cell under the control of the base station, the base station alone performs data retransmission.

If the mobile terminal has received the data from a plurality of cells, the base station transfers the negative acknowledgment to the radio network controller 3. The negative acknowledgment transferred to the radio network controller 3 contains a data number and cell IDs.

Upon receipt of the negative acknowledgment, the radio network controller 3 requests retransmission of the data, for which the negative acknowledgment is meant, from a base station which manages a cell corresponding to each of the cell IDs contained in the negative acknowledgment. At this time, the radio network controller 3 notifies the base station of a BFN (Node-B Frame Number) indicating a time for data retransmission as a part of the data retransmission request such that data retransmission is performed simultaneously in the cells. The base station having received the data retransmission request retransmits the designated data at the designated data retransmission time.

As a method of performing retransmission control by a base station alone, the function of MAC-hs (Medium Access Control-high speed) in High Speed Downlink Packet Access (HSDPA) can also be used.

A BFN described above can be used instead of a data number to be used between each of the base stations 2-1 and 2-2 and the radio network controller 3. In this case, the values of BFNs differ depending on the base stations 2-1 and 2-2. Accordingly, the radio network controller 3 calculates the values of the BFNs such that data transmission times in the base stations 2-1 and 2-2 are aligned with each other and then notifies the base stations 2-1 and 2-2 of the calculation results as retransmission timing signals.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the sprit and scope of the following claims. Further, the inventor's intent is to retain all equivalents even if the claims are amended during prosecution.

What is claimed is:

1. A mobile communication system including at least one mobile terminal, a plurality of base stations, and a radio network control apparatus, the at least one mobile terminal transmitting a first negative acknowledgment to any one of said plurality of base stations upon detection of an error in received data, said any one of said plurality of base stations retransmitting the data concerned upon receipt of the first negative acknowledgment, said radio network control apparatus controlling said any one of said plurality of base stations, wherein said at least one mobile terminal includes
a first negative acknowledgment transmission unit that attaches, to the first negative acknowledgment, cell identification information of a cell from which the received data is received upon detection of the error in the received data, each of said plurality of base stations includes
a determination unit that determines whether said cell identification information in said first negative acknowledgment includes only cell identification information of a cell managed by said any one of said plurality of base stations, and
a second negative acknowledgment transmission unit that transmits a second negative acknowledgment to said radio network control apparatus if said determination unit determines that said cell identification information in said first negative acknowledgment includes cell identification information of a cell other than a cell managed by said any one of said plurality of base stations in addition to a cell managed by said any one of said plurality of base stations, said second negative acknowledgment containing a data number for specifying the received data having said error detected by said at least one mobile terminal and said cell identification information, and said radio network control apparatus includes a decision unit that decides which of said plurality of base stations are to perform data retransmission on the basis of the cell identification information in said second negative acknowledgment, and a data retransmission request unit that transmits a data retransmission request including a data retransmission time to said decided ones of said plurality of base stations such that said decided ones of said plurality of base stations that receive the data retransmission request from said radio network control apparatus implements data retransmission synchronously based on the received data retransmission time.

2. The mobile communication system according to claim 1, wherein said second negative acknowledgment transmission unit transmits a data retransmission time together with said second negative acknowledgment.

3. The mobile communication system according to claim 2, wherein each of said plurality of base stations further comprises a retransmission data transmission unit that transmits retransmission data to said at least one mobile terminal if the cell identification information in said first negative acknowledgment includes only cell identification information indicating a cell managed by said any one of said plurality of base stations.

4. The mobile communication system according to claim 2, wherein each of said plurality of base stations further has a transmission unit that performs data distribution to said at least one mobile terminal by one of broadcast and multicast.

5. The mobile communication system according to claim 1, wherein each of said plurality of base stations further comprises a retransmission data transmission unit that transmits retransmission data to said at least one mobile terminal if the cell identification information in said first negative acknowledgment includes only cell identification information indicating a cell managed by said any one of said plurality of base stations.

6. The mobile communication system according to claim 1, wherein each of said plurality of base stations further has a transmission unit that performs data distribution to said at least one mobile terminal by one of broadcast and multicast.

7. A base station in a mobile communication system including at least one mobile terminal, a plurality of base stations of which said base station is one, and a radio network controller, the at least one mobile terminal transmitting a first negative acknowledgment to said base station upon detection of an error in received data, said base station retransmitting the data concerned upon receipt of the first negative acknowledgment, the radio network controller controlling said plurality of base stations, said base station comprising:

a determination unit that determines whether cell identification information in the first negative acknowledgment includes only cell identification information of a cell managed by said base station;

a second negative acknowledgment transmission unit that transmits a second negative acknowledgment to the radio network controller if said determination unit determines that the cell identification information in the first negative acknowledgment includes cell identification information of a cell other than a cell managed by said base station in addition to a cell managed by said base station, the second negative acknowledgment containing a data number for specifying the received data having the error detected by the at least one mobile terminal and the cell identification information; and a data transmission unit that transmits designated data at a time designated by the radio network controller to the at least one mobile terminal, wherein said base station and each of said plurality of base stations that receive a data retransmission request from said radio network controller implement data retransmission synchronously based on a received data retransmission time.

8. The base station according to claim 7, further comprising a retransmission data transmission unit that transmits retransmission data to the at least one mobile terminal if the cell identification information in the first negative acknowledgment includes only cell identification information indicating a cell managed by said base station.

9. The base station according to claim 7, further comprising a distribution unit that performs data distribution to said at least one mobile terminal by one of broadcast and multicast.

10. A radio network controller in a mobile communication system including a mobile terminal, a plurality of base stations, and said radio network controller, the mobile terminal transmitting a first negative acknowledgment to any one of the plurality of base stations upon detection of an error in received data, said any one of the plurality of base stations retransmitting the data concerned upon receipt of the first negative acknowledgment, the radio network controller controlling said any one of the plurality of base stations, said radio network controller comprising:

a decision unit that receives from said any one of the plurality of base stations a second negative acknowledgment containing one or more data numbers specifying the data having the error detected by the mobile terminal and cell identification information of a cell other than a cell managed by said any one of said plurality of base stations in addition to a cell managed by said any one of said plurality of base stations, the cell identification information indicating the cells from which the data is received by the mobile terminal and decides, for each of the one or more data numbers, the plurality of base stations which are to perform data retransmission on the basis of the cell identification information in the second negative acknowledgment; and a data retransmission request unit that transmits a data retransmission request including a data retransmission time to the decided base stations such that said decided ones of said plurality of base stations that receive the data retransmission request from said radio network controller implements data retransmission synchronously based on the received data retransmission time.

11. The radio network controller according to claim 10, wherein said data retransmission request unit transmits the data retransmission time in addition to the retransmission request.

12. A retransmission control method for a mobile communication system including a mobile terminal, a plurality of base stations, and a radio network controller, the mobile terminal transmitting a first negative acknowledgment to any one of said plurality of base stations upon detection of an error in received data, said any one of said plurality of base stations retransmitting the data concerned upon receipt of the first negative acknowledgment, and the radio network controller controlling said any one of said plurality of base stations, said method comprising the steps of:
- (A) the mobile terminal transmits the first negative acknowledgment upon detection of the error in the received data, and the first negative acknowledgment contains cell identification information indicating a cell from which the received data is received,
- (B) said any one of said plurality of base stations transmits a second negative acknowledgment to the radio network controller if the cell identification information in the first negative acknowledgment includes cell identification information of a cell other than a cell managed by said any one of said plurality of base stations in addition to a cell managed by said any one of said plurality of base stations, and the second negative acknowledgment contains a data number for specifying the data having the error detected by the mobile terminal and the cell identification information, and
- (C) the radio network controller decides which of said plurality of base stations are to perform data retransmission on the basis of the cell identification information in the second negative acknowledgment and transmits a data retransmission request including a data retransmission time to the decided ones of said plurality of base stations such that said decided ones of said plurality of base stations that receive the data retransmission request from said radio network controller implements data retransmission synchronously based on the received data retransmission time.

13. The retransmission control method according to claim 12, wherein the radio network controller transmits a data retransmission time to the decided ones of said plurality of base stations in addition to the data retransmission request in said step (C).

14. The retransmission control method according to claim 13, wherein said any one of said plurality of base stations transmits retransmission data to the mobile terminal in said step (B) if the cell identification information in the first negative acknowledgment includes only cell identification information indicating a cell managed by said any one of said plurality of base stations.

15. The retransmission control method according to claim 13, wherein said any one of said plurality of base stations performs data distribution to the mobile terminal by one of broadcast and multicast in said step (B).

16. The retransmission control method according to claim 12, wherein said any one of said plurality of base stations transmits retransmission data to the mobile terminal in said step (B) if the cell identification information in the first negative acknowledgment includes only cell identification information indicating a cell managed by said any one of said plurality of base stations.

17. The retransmission control method according to claim 12, wherein said any one of said plurality of base stations performs data distribution to the mobile terminal by one of broadcast and multicast in said step (B).

18. A retransmission control method for a plurality of base stations in a mobile communication system including a mobile terminal, said plurality of base stations, and a radio network controller, the mobile terminal transmitting a first negative acknowledgment to any one of said plurality of base stations upon detection of an error in received data, said any one of said plurality of base stations retransmitting the data concerned upon receipt of the first negative acknowledgment, the radio network controller controlling said any one of said plurality of base stations, said method comprising the steps of:
- (A) transmitting data to the mobile terminal;
- (B) determining whether cell identification information in the first negative acknowledgment includes only cell identification information of a cell managed by said any one of said plurality of base stations; and
- (C) transmitting a second negative acknowledgment to the radio network controller if the determination step determines that the cell identification information in the first negative acknowledgment includes cell identification information of a cell other than a cell managed by said any one of said plurality of base stations in addition to a cell managed by said any one of said plurality of base stations, the second negative acknowledgment containing a data number for specifying the received data having the error detected by the mobile terminal and the cell identification information; and
- transmitting designated data at a time designated by the radio network controller to the mobile terminal,
- wherein said plurality of base stations that receives a data retransmission request from said radio network controller implements data retransmission synchronously based on a received data retransmission time.

19. The method according to claim 18, further comprising a step of:
- transmitting retransmission data to the mobile terminal if the cell identification information in the first negative acknowledgment includes only cell identification information indicating a cell managed by said any one of said plurality of base stations.

20. The method according to claim 18, wherein said step (A) performs data distribution to the mobile terminal by one of broadcast and multicast.

21. A retransmission control method for a radio network controller in a mobile communication system including a mobile terminal, a plurality of base stations, and said radio network controller, the mobile terminal transmitting a first negative acknowledgment to any one of said plurality of base stations upon detection of an error in received data, said any one of said plurality of base stations retransmitting the data concerned upon receipt of the first negative acknowledgment, the radio network controller controlling said any one of said plurality of base stations, said method comprising the steps of:
- (A) receiving, from said any of said plurality of base stations, a second negative acknowledgment containing a data number specifying the data having the error detected by the mobile terminal and cell identification information of a cell other than a cell managed by said any one of said plurality of base stations in addition to a cell managed by said any one of said plurality of base stations, the cell identification information indicating the cells from which the data is received by the mobile terminal;
- (B) deciding, for the data number, which of said plurality of base stations are to perform data retransmission on the basis of the cell identification information in the second negative acknowledgment; and
- (C) transmitting a data retransmission request including a data retransmission time to the decided ones of said plurality of base stations such that said decided ones of said plurality of base stations that receive the data retransmission request from said radio network controller implements data retransmission synchronously based on the received data retransmission time.

22. The method according to claim 21, wherein said step (C) further comprises transmitting the data retransmission time in addition to the retransmission request.

23. A non-transitory recording medium having recorded thereon a program for a retransmission control method used in a mobile communication system including a mobile terminal, a plurality of base stations that, when the mobile terminal detects an error in received data, performs retransmission of the data concerned, and a radio network controller that controls said plurality of base stations, the program causing a computer to operate as any one of said plurality of base stations, the program comprising the steps of:

(A) determining whether cell identification information in a first negative acknowledgment transmitted from the mobile terminal includes cell identification information of a cell other than a cell managed by said any one of said plurality of base stations; and (B) transmitting a second negative acknowledgment to said radio network controller if the determining step determines that the cell identification information in the first negative acknowledgment includes cell identification information of a cell other than a cell managed by said any one of said plurality of base stations in addition to a cell managed by said any one of said plurality of base stations, the transmitting step including, in the second negative acknowledgment, a data number for specifying the received data having the error detected by the mobile terminal and the cell identification information; and transmitting designated data at a time designated by the radio network controller to the mobile terminal, wherein said plurality of base stations that receive a data retransmission request from said radio network controller implements data retransmission synchronously based on a received data retransmission time.

24. The non-transitory recording medium according to claim 23, wherein the program further comprises a step of:

transmitting retransmission data to the mobile terminal in said step (A), if the cell identification information in the first negative acknowledgment includes only cell identification information indicating a cell managed by said any one of said plurality of base stations.

25. A non-transitory recording medium having recorded thereon a program for a retransmission control method used in a mobile communication system including a mobile terminal, a plurality of base stations that, when the mobile terminal detects an error in received data, perform retransmission of the data concerned, and a radio network controller that controls the plurality of base stations, the program causing a computer to operate as the radio network controller, the program comprising the steps of:

(A) receiving a negative acknowledgment transmitted from any one of the plurality of base stations containing a data number specifying the received data having the error detected by the mobile terminal and cell identification information of a cell other than a cell managed by the any one of the plurality of base stations in addition to a cell managed by the any one of the plurality of base stations, the cell identification information indicating the cells from which the data is received by the mobile terminal;

(B) deciding which of the plurality of base stations are to perform data retransmission on the basis of the cell identification information in the negative acknowledgment; and (C) transmitting a data retransmission request including a data retransmission time to the decided ones of the plurality of base stations such that said decided ones of said plurality of base stations that receive the data retransmission request from said radio network controller implement data retransmission synchronously based on the received data retransmission time.

26. The non-transitory recording medium according to claim 25, wherein said step (C) further comprises transmitting the data retransmission time in addition to the data retransmission request.

* * * * *